United States Patent
Hou et al.

(10) Patent No.: US 9,221,368 B2
(45) Date of Patent: Dec. 29, 2015

(54) WARNING DEVICE FOR A CAR SEAT BASE

(71) Applicant: LERADO (ZHONG SHAN) INDUSTRIAL CO., LTD., Zhong Shan, Guang Dong Province (CN)

(72) Inventors: Hung-Chung Hou, Tai-Bau (TW); Yu-Te Chou, Chiayi County (TW); Chin-Hu Wang, Chiayi (TW); Yu-Le Lin, Yunlin County (TW)

(73) Assignee: LERADO (ZHONG SHAN) INDUSTRIAL CO., LTD., Zhong Shan, Guang Dong Province (CN)

( * ) Notice: Subject to any disclaimer, the term of this patent is extended or adjusted under 35 U.S.C. 154(b) by 33 days.

(21) Appl. No.: 13/946,699

(22) Filed: Jul. 19, 2013

(65) Prior Publication Data

US 2014/0327281 A1 Nov. 6, 2014

(30) Foreign Application Priority Data

May 2, 2013 (CN) .................. 2013 2 0229654 U

(51) Int. Cl.
*A47C 7/62* (2006.01)
*B60N 2/44* (2006.01)
*B60N 2/28* (2006.01)

(52) U.S. Cl.
CPC .............. *B60N 2/44* (2013.01); *B60N 2/2821* (2013.01); *B60N 2/2824* (2013.01); *B60N 2/2845* (2013.01); *B60N 2/2887* (2013.01)

(58) Field of Classification Search
CPC ...... B60N 2/44; B60N 2/286; B60N 21/2821; A47D 1/103

USPC ................ 297/253, 254, 255, 256.16, 250.1, 297/217.2, 217.3, 217.4
See application file for complete search history.

(56) References Cited

U.S. PATENT DOCUMENTS

| 4,634,177 | A * | 1/1987 | Meeker .................... 297/256.13 |
| 5,431,478 | A * | 7/1995 | Noonan ........................ 297/130 |
| 6,863,286 | B2 * | 3/2005 | Eros et al. ................... 280/47.38 |
| 7,328,946 | B2 * | 2/2008 | Hendrikus Van Montfort et al. .............................. 297/253 |
| 7,467,825 | B2 * | 12/2008 | Jane Santamaria ........... 297/253 |
| 7,845,719 | B2 * | 12/2010 | Flannery ................. 297/174 CS |
| 8,100,474 | B2 * | 1/2012 | Christ et al. ................. 297/253 |
| 8,366,192 | B2 * | 2/2013 | Clement et al. ............. 297/253 |
| 8,419,129 | B2 * | 4/2013 | Inoue et al. .............. 297/256.13 |
| 8,434,821 | B2 * | 5/2013 | Gibree ...................... 297/250.1 |
| 2011/0140491 | A1 * | 6/2011 | Williams et al. ......... 297/256.16 |

* cited by examiner

*Primary Examiner* — David E Allred
*Assistant Examiner* — Alexander Harrison
(74) *Attorney, Agent, or Firm* — Muncy, Geissler, Olds & Lowe, P.C.

(57) ABSTRACT

A warning device for a car seat base includes a car seat base, a support leg and a color signal revealing mechanism. The car seat base is capable of mounting on a vehicle seat and provided with a support face for supporting a car seat thereupon and a signal window for showing signals by colors. The support leg is movably and rotably mounted to the car seat base. Once the length of the support leg is not yet good enough to abut the car seat base, or someday the lock means of the support leg is failed, the weight of the support leg would carry itself moving downward, by this way to cause the signal element to reveal a warning signal from signal window to the user.

9 Claims, 7 Drawing Sheets

WARNING DEVICE FOR A CAR SEAT BASE

BACKGROUND OF THE INVENTION

1. Field of the Invention

The present invention relates to a warning device for a car seat base, especially to a warning device that warning of the support leg not in loaded position and that may lose effective support to the ear seat base.

2. Description of the Related Art

Car seat base is adapted to connect on a vehicle seat through a vehicle fixed point (ISOFIX), thereby providing the convenience of mounting a car seat thereupon without the troublesome of tying on and untying safety belt from the car seat.

When a vehicle brakes suddenly in high speed or encounters collision accidently, the car seat base is tending to either moving or rolling forward by the force of inertia. To avoid said accident, U.S. Pat. Nos. 7,753,445, 6,817,665, 5,487,588 and 7,097,245 have provided some car seat bases equipped with a support leg for preventing the rolling and moving of the car seat base and car seat in the event of vehicular collision and quick braking, as well as to limit the excursion of a seat occupant's head beyond acceptable limits.

The support leg includes at least an upper tube, a locking means and a lower tube lockable. The upper tube and the lower tube are telescopically and adjustable in length by the locking means. Normally, the support leg has to be adjusted and fixed in a length that permits its lower end to stick on the vehicle floor, and the upper end to abut upward to support the front end of the car seat base. Once the locking means is failed, the support leg would then lose the expected support function, but the user has no means to receive a warning of such a dangerous silent a small change.

SUMMARY OF THE INVENTION

To overcome the above described drawback of the car seat base with the support leg, the present invention provides a warning device for the car seat base which includes a car seat base, a support leg and a color signal revealing mechanism. The car seat base is capable of mounting on a vehicle seat and provided with a support face for supporting a car seat thereupon and provides a signal window for showing signals by colors.

The support leg is movably and rotably mounted to the car seat base. Once the length of the support leg is not yet good enough to abut the car seat base, or someday if the lock means of the support leg is failed, the weight of the support leg would carry itself moving downward, by this way to cause the signal element to reveal a warning signal from signal window to the user.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

An embodiment of the warning device for a car seat base according to the present invention, includes a car seat base 1, a support leg 2 and a color signal revealing mechanism 4.

Figure 1:
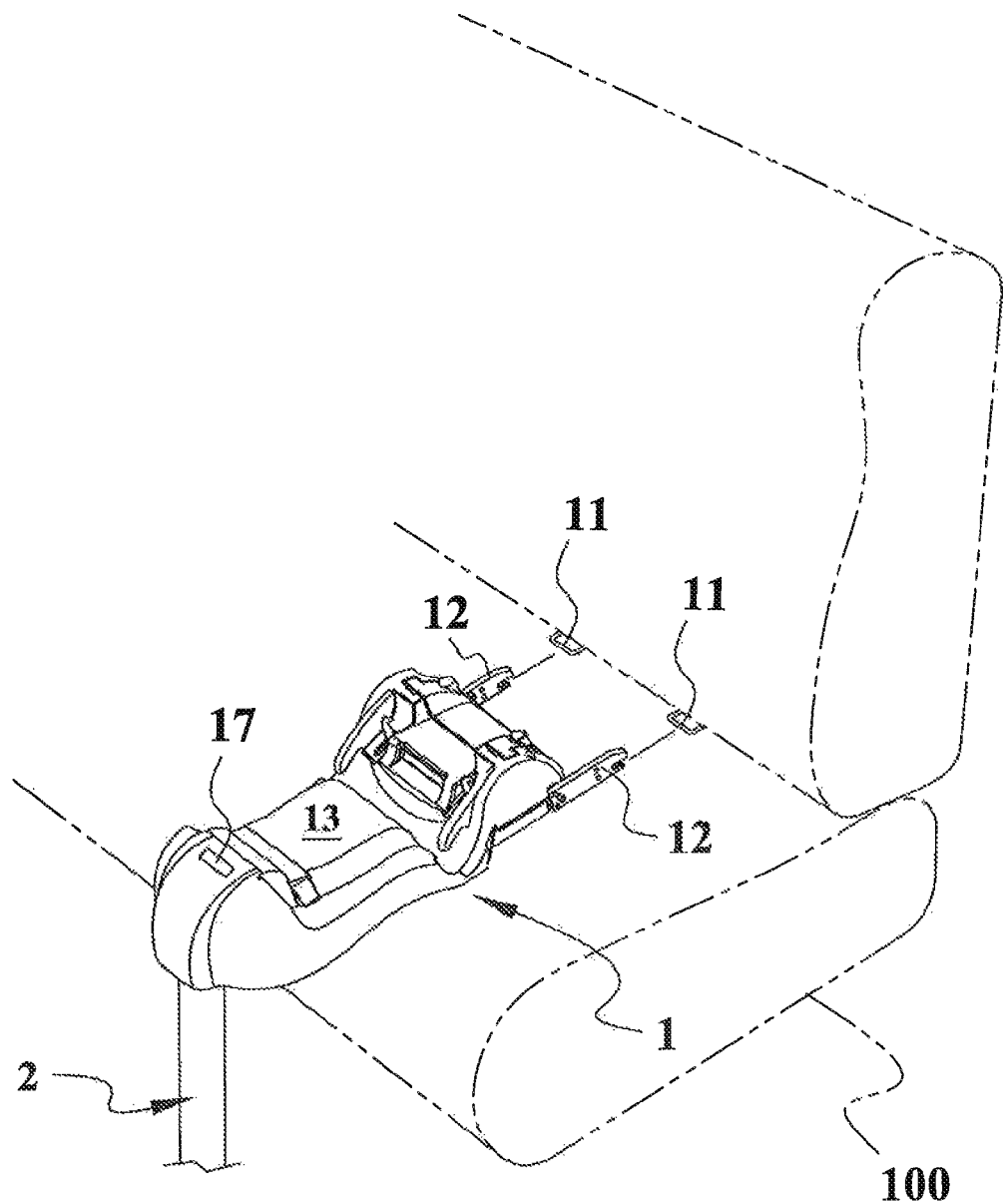
FIG. 1 is a perspective view schematically showing a car seat base with the warning device according to the present invention.

Referring to FIG. 1, the car seat base 1 is capable of mounting on a vehicle seat 100, and provided with a support face 13 for supporting a car seat 20 thereupon and a signal window 17 for showing signals by colors.

Figure 2:
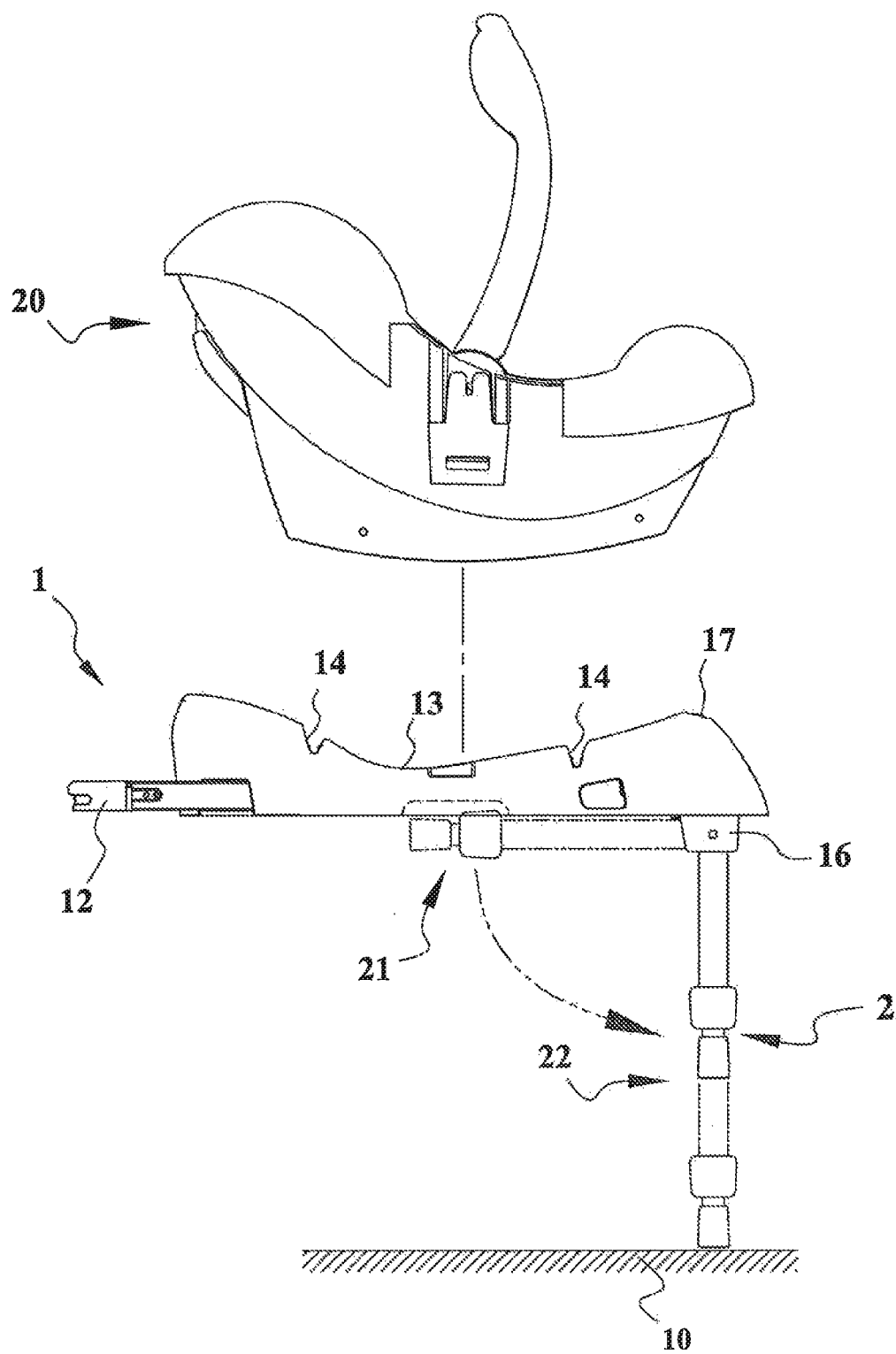
FIG. 2 is a side view schematically showing the car seat base having a support leg for supporting at one end thereof, the support leg can be retained in a folded position, and capable rotating to an unloaded position before being actually stuck on the vehicle floor.
Figure 3:
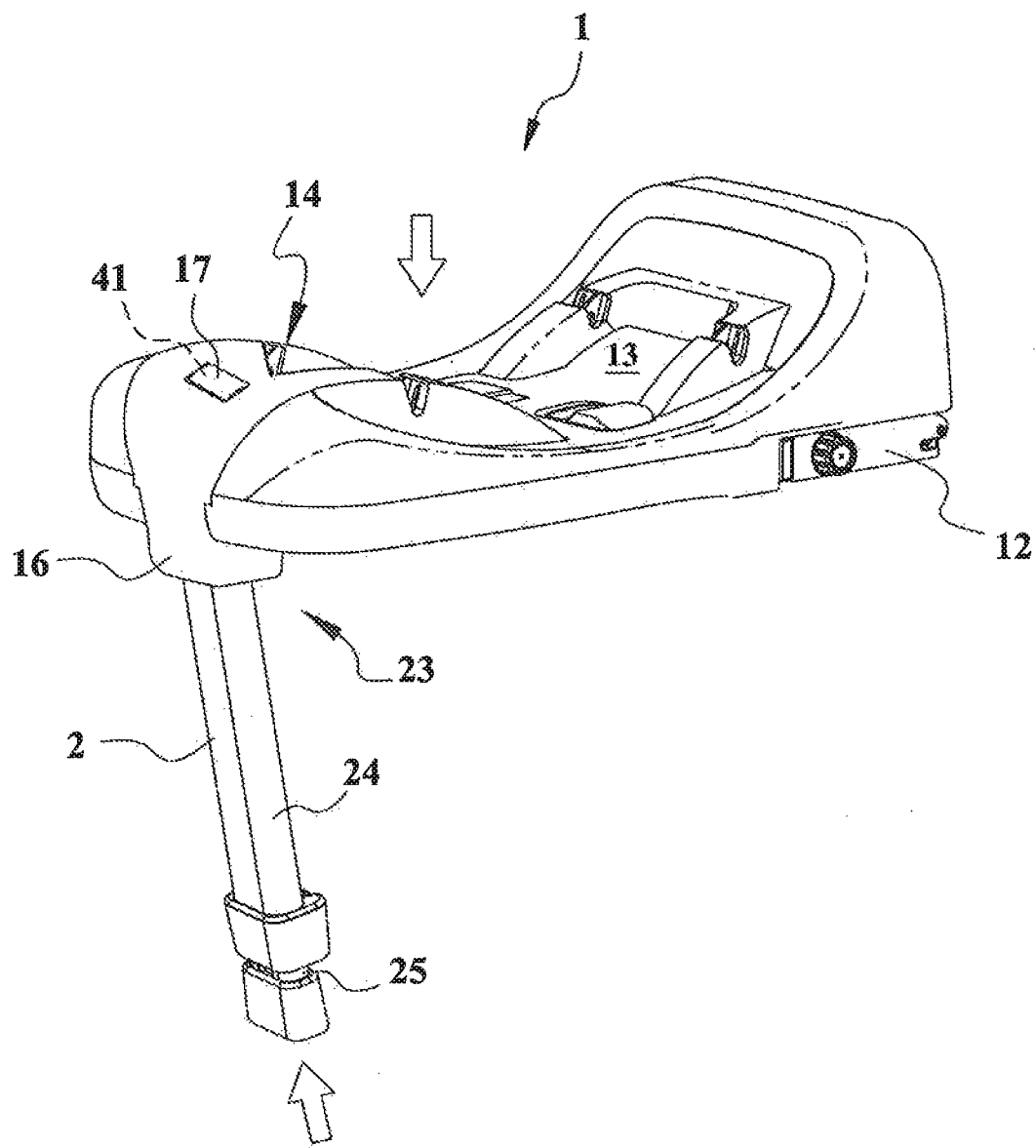
FIG. 3 is a perspective view schematically showing the support leg has been actually stuck on the vehicle floor for supporting the weight of the car seat base, when the support leg supports the weight of the car seat base, the car seat base is moving downward, this makes the support leg to move to its loaded position.
Figure 4:
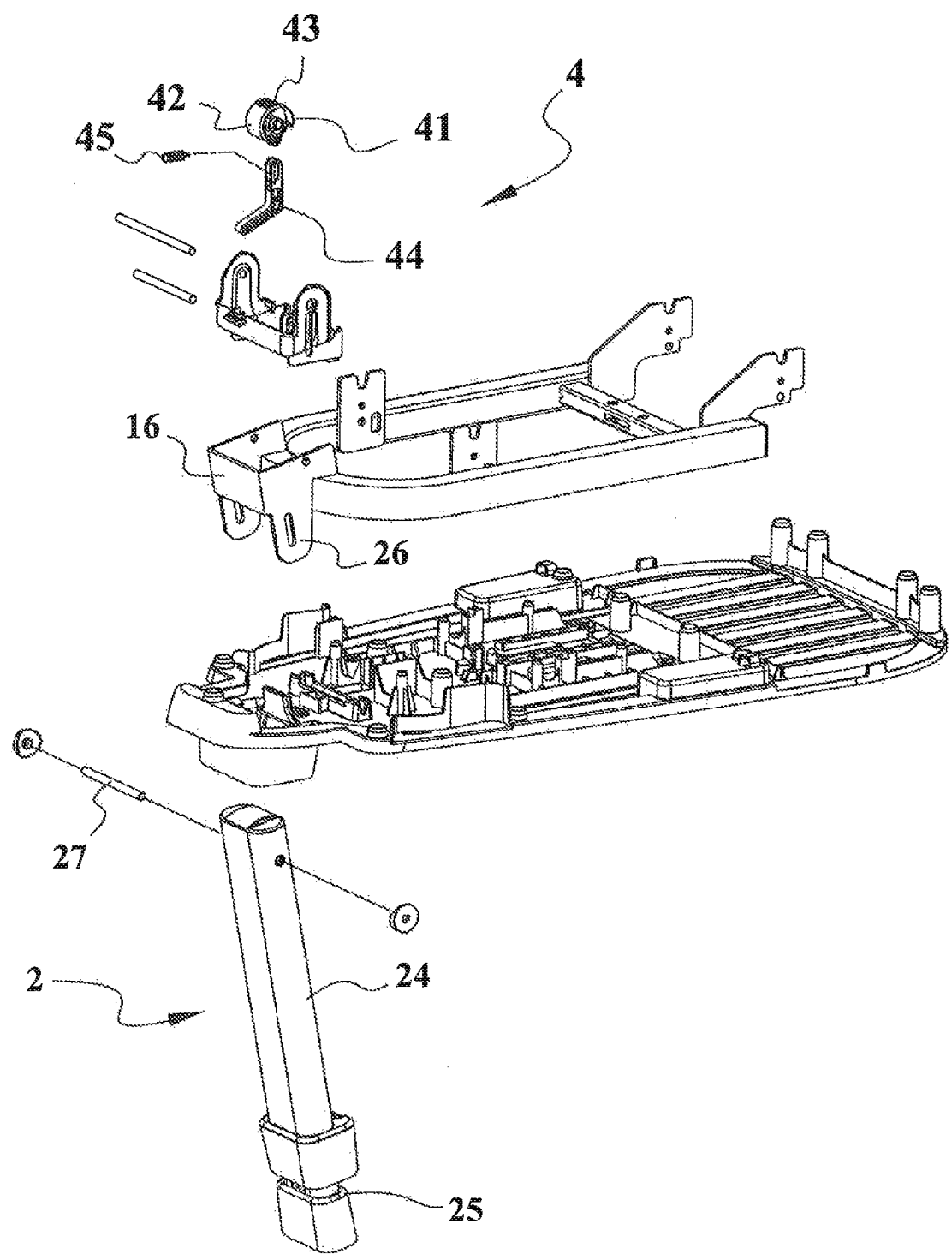
FIG. 4 is a perspective exploded view illustrating the assembly of the warning device and the car seat base of the present invention.

Referring to FIGS. 2 and 4, the support leg 2 is movably and rotably mounted to the car seat base 1, and has a folded position 21 for shipping and storage in a relative small space, an unloaded erecting position 22 and a loaded erecting position 23.

The car seat base 1 has a pair of rear extending coupling element 12 for connecting to a vehicle fixed point ISOFIX 11. The car seat base 1 may have a plurality of hooks 14 for retaining the car seat 20 atop the support face 13.

The car seat base 1 has a pivot mount 16 formed with a slot 26 for guiding the support leg 2 to move between the unloaded erecting position 22 and the loaded erecting position 23, and permitting the support leg 2 to rotate between the unloaded erecting position 22 and the folded position 21.

The support leg 2 is pivoted to the pivot mount 16 by a pivot pin 27, and the pivot mount 16 is inserted through the support leg 2 and the slot 26, so as to keep the support leg 2 to be retained within the slot 26 and capable of rotation, moving upward and downward.

The support leg 2 may be rotated to the folded position 21, in which position, the support leg 2 is substantially parallel and retainable to the downside of the car seat base 1.

In this embodiment, the support leg 2 may include an upper tube 24 and a lower tube 25 telescopically and lockably connected with the upper tube 24. By this assembly, the lower tube 25 can be locked in a position to stick on a vehicle floor 10, and let the upper tube 24 to support the weight of the car seat base 1 in the loaded erecting position 23.

The color signal revealing mechanism 4 is installed between the car seat base 1 and the support leg 2, and includes a signal element 41 and an abutting element 44.

Referring to FIGS. 3 to 7, the signal element 41 is associated with the support leg 2 through the abutting element 44, and when the support leg 2 is moved to the unloaded erecting position 22, the signal element 41 is revealing a first color area 42 from the signal window 17; and when the support leg 2 is moved to the loaded erecting position 22, the signal element 41 reveals a second color area 43 from the signal window 17. The signal element 41 may be embodied as a rotor covered with a first color area 42 and a second color area 43.

The abutting element 44 has an upper end pivoted with the signal element 41, and a lower end for abutting upward by the support leg 2 when the support leg 2 is moved to the loaded erecting position 22.

Figure 5:
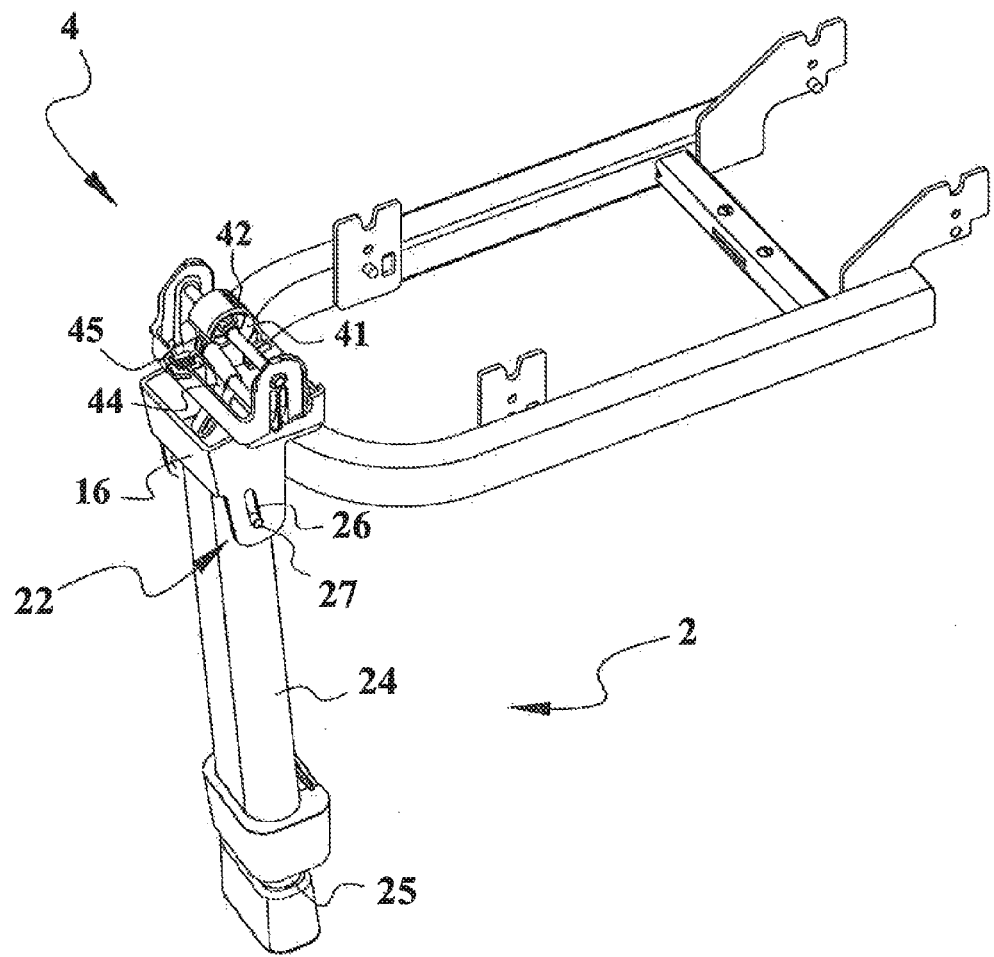
FIG. 5 is a perspective view illustrating the status of the warning device when the support leg is moved to an unloaded position but not yet being locked up to fix its length (please note that the pivot pin is stayed at the lower end of the slot).

Referring to FIGS. 4 and 5, the abutting element 44 is preferably biased by a resilient element 45 so as to keep the signal element 41 revealing the first color area 42 before the support leg 2 moving to the loaded erecting position 23.

Figure 6:
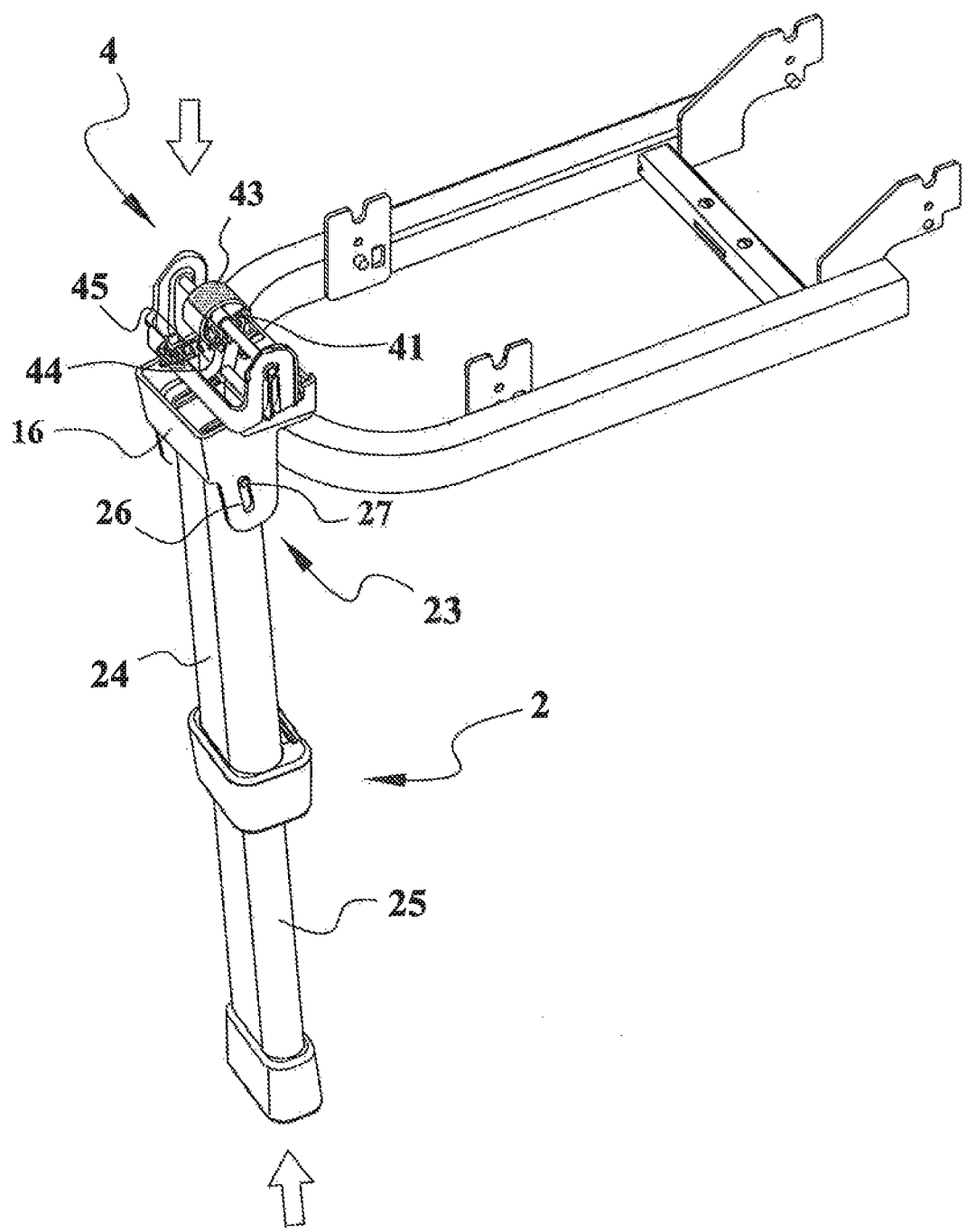
FIG. 6 is a perspective view illustrating the change of the warning device when the support leg is positioned in a loaded position (please note that the pivot pin has been moved upward to the upper end of the slot).
Figure 7:
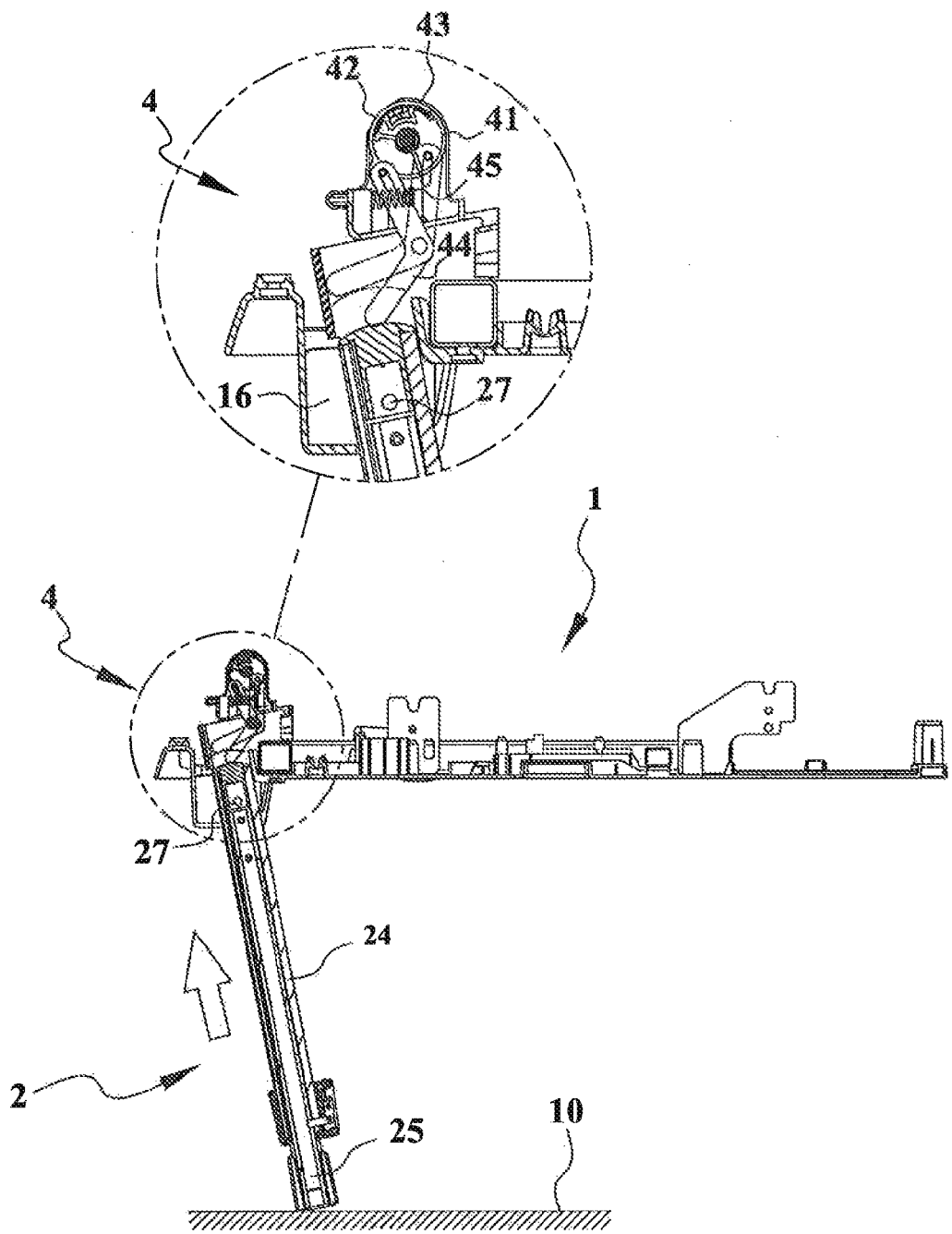
FIG. 7 is a perspective view illustrating the change of the warning device when the support leg is changing from the unloaded position to the loaded position.

Referring to FIGS. 6 and 7, when the support leg 2 has been locked in a good length would support the car seat base 1 upwardly, and then the weight of the car seat base 1 would carry the pivot mount 16 to move downward, this makes the pivot pin 27 to move to the upper end of the slot 26. When the pivot pin 27 moved to the upper end of the slot 26, the upper end of the support leg 2 would force the abutting element 44 to rotate the signal element 41, so as to make the signal element 41 to reveal the second color area 43 from the signal window 17. By the second color area 43 showing from the signal window 17, user can know the support leg 2 is in a loaded position 23 and working in a good condition.

Referring again to FIG. 3, once the length of the support leg 2 is not yet good enough to abut the car seat base 1 upwardly, or someday if the lock means (not shown) of the support leg 2 is failed, the weight of the support leg 2 would carry the pivot pin 27 to fall to the lower end of the slot 26, this would set the abutting element 44 free and let the resilient element 45 to rotate the signal element 41 to reveal the first color area 42 from the signal window 17 as a warning signal to the user.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A warning device for a car seat base, including:
   a car seat base (1), capable of mounting on a vehicle seat (100), having a support face (13) for supporting a car seat (20) thereupon and a signal window (17) for showing signals by colors;
   a support leg (2), movably and rotably mounted to the car seat base (1), having a folded position (21), an unloaded erecting position (22) and a loaded erecting position (23); and
   a color signal revealing mechanism (4) installed between the car seat base (1) and the support leg (2), including a signal element (41) and an abutting element (44); wherein the abutting element (44) has an upper end pivoted with the signal element (41), and a lower end for abutting upward by the support leg (2) when the support leg (2) is moved to the loaded erecting position (22); and wherein the signal element (41) is associated with the support leg (2) through the abutting element (44), and when the support leg (2) is moved to the unloaded erecting position (22), the signal element (41) reveals a first color area (42) from the signal window (17); and when the support leg (2) is moved to the loaded erecting position (22), the signal element (41) reveals a second color area (43) from the signal window (17).

2. The warning device for a car seat base of claim 1, wherein the signal element (41) is a rotor having the first color area (42) and the second color area 43).

3. The warning device for a car seat base of claim 1, wherein the support leg (2) includes an upper tube (24) and a lower tube (25) telescopically and lockably connected with the upper tube (24); wherein the lower tube (25) can be locked in a position to stick on a vehicle floor (10), and let the upper tube (24) to support the weight of the car seat base (1) in the loaded erecting position (23).

4. The warning device for a car seat base of claim 1, wherein abutting element 44 is biased by a resilient element (45) to keep the signal element (41) revealing the first color area (42) before the support leg (2) moving to the loaded erecting position (23).

5. The warning device for a car seat base of claim 1, wherein the support leg (2) is substantially parallel to a downside of the car seat base (1), when being rotated to the folded position (21).

6. The warning device for a car seat base of claim 1, wherein the car seat base (1) has a pair of rear extending coupling element (12) for connecting to a vehicle fixed point (ISOFIX) (11).

7. The warning device for a car seat base of claim 1, wherein the car seat base (1) has a plurality of hooks (14) for retaining the car seat (20) atop the support face (13).

8. The warning device for a car seat base of claim 1, wherein the car seat base (1) has a pivot mount (16) formed with a slot (26) for guiding the support leg (2) to move between the unloaded erecting position (22) and the loaded erecting position (23), and permitting the support leg (2) to rotate between the unloaded erecting position (22) and the folded position (21).

9. The warning device for a car seat base of claim 8, wherein the support leg (2) is pivoted to the pivot mount (16) by a pivot pin (27), and the pivot mount (16) is inserted through the support leg (2) and the slot (26), so as to keep the support leg (2) to be retained within the slot (26) and capable of rotation, moving upward and downward.

* * * * *